US011386046B2

(12) United States Patent
Tokita

(10) Patent No.: US 11,386,046 B2
(45) Date of Patent: Jul. 12, 2022

(54) APPARATUS FOR SETTING FILE NAME FOR SCAN IMAGE, METHOD OF CONTROLLING SAME, AND STORAGE MEDIUM

(71) Applicant: CANON KABUSHIKI KAISHA, Tokyo (JP)

(72) Inventor: Ken Tokita, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 137 days.

(21) Appl. No.: 16/139,996

(22) Filed: Sep. 24, 2018

(65) Prior Publication Data
US 2019/0102385 A1 Apr. 4, 2019

(30) Foreign Application Priority Data

Oct. 3, 2017 (JP) .............................. JP2017-193616

(51) Int. Cl.
G06F 16/00 (2019.01)
G06F 16/16 (2019.01)
(Continued)

(52) U.S. Cl.
CPC .......... *G06F 16/164* (2019.01); *G06V 10/235* (2022.01); *G06V 30/153* (2022.01);
(Continued)

(58) Field of Classification Search
CPC combination set(s) only.
See application file for complete search history.

(56) References Cited

U.S. PATENT DOCUMENTS 8,737,728 B2 * 5/2014 Bhardwaj ............. G06F 16/583
382/165
9,361,531 B2 * 6/2016 Stella ........................ G06T 7/10
(Continued)

FOREIGN PATENT DOCUMENTS

JP H11-7517 1/1999
JP 2005-275849 10/2005
(Continued)

OTHER PUBLICATIONS

U.S. Appl. No. 16/100,943, filed Aug. 10, 2018.
(Continued)

*Primary Examiner* — Farhan M Syed
(74) *Attorney, Agent, or Firm* — Venable LLP

(57) ABSTRACT

An apparatus includes: a display control unit that displays a UI screen for performing a predetermined process, the UI screen being a screen where unit blocks each assumed as a single continuous character string in a scan image are displayed to be selectable by the user; an OCR process unit that performs an OCR process on unit blocks selected by the user through the UI screen to thereby extract character strings; and a setting unit that sets incidental information for the predetermined process by using the character strings extracted by the OCR process unit. The display control unit separates a character string satisfying a predetermined separation condition among the character strings extracted by the OCR process unit from the unit blocks selected by the user, and displays the separated character strings on the UI screen such that the separated character strings are selectable by the user.

13 Claims, 16 Drawing Sheets

(51) Int. Cl.
  *H04N 1/00* (2006.01)
  *G06V 10/22* (2022.01)
  *G06V 30/148* (2022.01)
  *G06V 30/413* (2022.01)
  *G06V 30/414* (2022.01)
  *G06V 30/10* (2022.01)

(52) U.S. Cl.
  CPC .......... *G06V 30/413* (2022.01); *G06V 30/414* (2022.01); *H04N 1/00225* (2013.01); *G06V 30/10* (2022.01); *H04N 2201/0094* (2013.01)

(56) References Cited

U.S. PATENT DOCUMENTS

| | | | |
|---|---|---|---|
| 9,398,191 B2* | 7/2016 | Saka | G06V 30/416 |
| 9,633,271 B2* | 4/2017 | Stella | G06K 9/6277 |
| 10,007,690 B2* | 6/2018 | Finkler | G06F 16/2272 |
| 10,057,449 B2 | 8/2018 | Tokita | H04N 1/04 |
| 10,217,020 B1* | 2/2019 | Rivard | G06V 10/768 |
| 10,296,788 B1* | 5/2019 | Rivard | G06V 30/40 |
| 10,331,657 B1* | 6/2019 | Cole | G06F 16/2365 |
| 10,574,839 B2* | 2/2020 | Yamazaki | H04N 1/00331 |
| 10,606,824 B1* | 3/2020 | Fire | G06F 16/2365 |
| 2002/0084978 A1* | 7/2002 | Araki | H04N 1/387 345/156 |
| 2003/0198398 A1* | 10/2003 | Guan | H04N 1/387 382/286 |
| 2006/0056660 A1* | 3/2006 | Tojo | G06K 9/00463 382/112 |
| 2010/0067793 A1* | 3/2010 | Serrano | G06K 9/6297 382/179 |
| 2013/0084000 A1* | 4/2013 | Bhardwaj | G06K 9/6215 382/165 |
| 2013/0268528 A1* | 10/2013 | Kawano | G06F 16/13 707/736 |
| 2014/0026104 A1 | 1/2014 | Tokita | G06F 3/04817 |
| 2014/0119658 A1* | 5/2014 | Suzuki | G06F 3/0488 382/187 |
| 2015/0302277 A1* | 10/2015 | Suzuki | G06V 10/235 382/229 |
| 2016/0012465 A1* | 1/2016 | Sharp | G06Q 20/321 705/14.17 |
| 2016/0014299 A1* | 1/2016 | Saka | G06V 10/95 358/1.2 |
| 2016/0019430 A1* | 1/2016 | Stella | G06K 9/6215 382/310 |
| 2016/0092484 A1* | 3/2016 | Finkler | G06F 16/258 707/715 |
| 2016/0224532 A1* | 8/2016 | Miller | G06F 17/30572 |
| 2016/0239716 A1* | 8/2016 | Stella | G06V 30/40 |
| 2016/0328432 A1* | 11/2016 | Raghunathan | G06F 16/2264 |
| 2017/0186066 A1* | 6/2017 | Bruch | G06Q 30/0623 |
| 2018/0089188 A1* | 3/2018 | Kharisma | G06F 3/0481 |
| 2018/0089289 A1* | 3/2018 | Zhang | G06F 16/25 |
| 2019/0102385 A1* | 4/2019 | Tokita | G06F 16/164 |
| 2019/0155802 A1* | 5/2019 | Miller | G06F 16/235 |
| 2019/0155803 A1* | 5/2019 | Miller | G06F 16/2372 |

FOREIGN PATENT DOCUMENTS

| | | |
|---|---|---|
| JP | 2013-074609 | 4/2013 |
| JP | 2015-215878 | 12/2015 |
| JP | 2016-024488 | 2/2016 |
| JP | 2017-129926 | 7/2017 |

OTHER PUBLICATIONS

U.S. Appl. No. 16/103,692, filed Aug. 14, 2018.
U.S. Appl. No. 16/103,695, filed Aug. 14, 2018.
Office Action dated Jul. 6, 2021 in counterpart Japanese Application No. 2017-193616, together with English translation thereof.

* cited by examiner

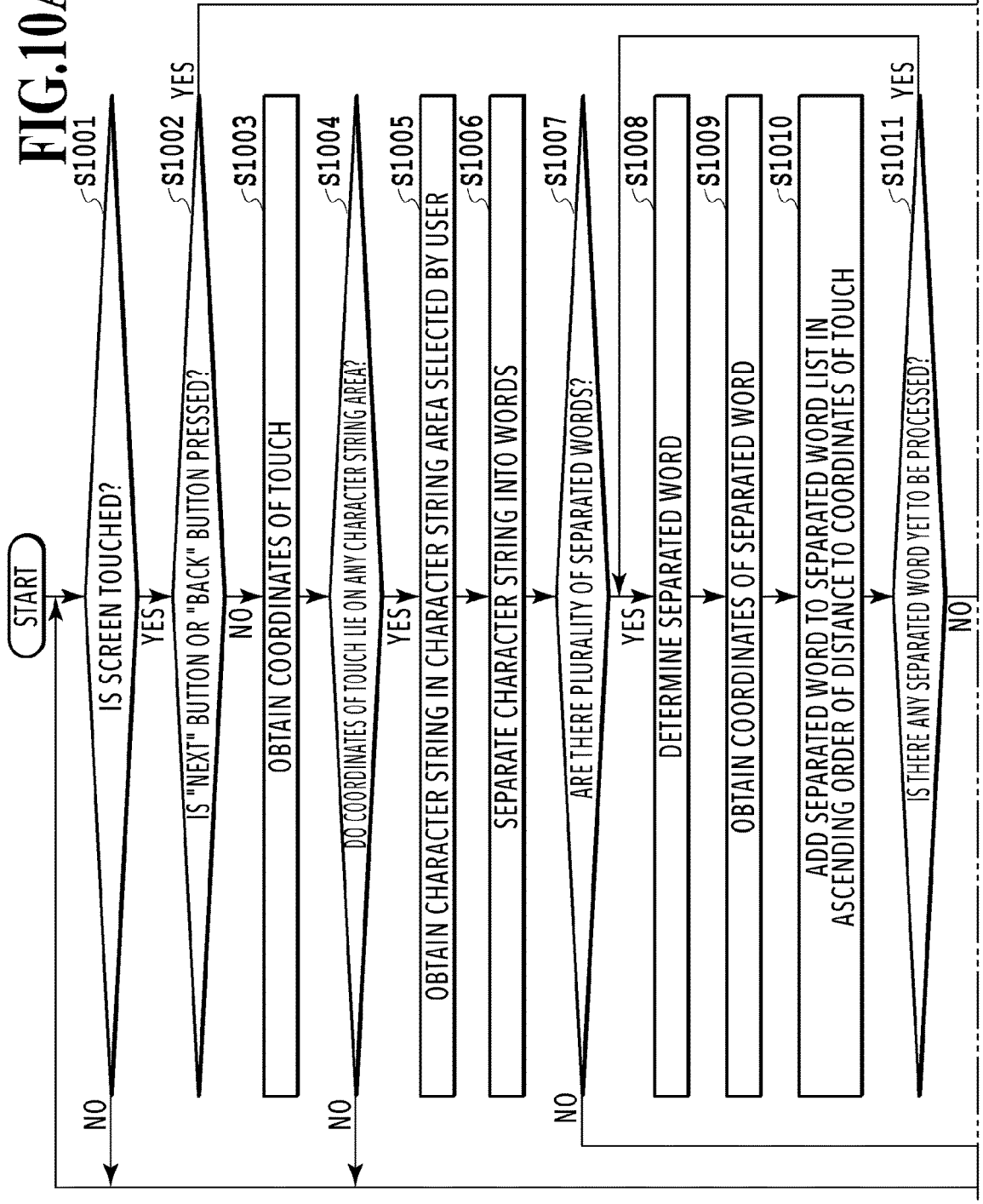

APPARATUS FOR SETTING FILE NAME FOR SCAN IMAGE, METHOD OF CONTROLLING SAME, AND STORAGE MEDIUM

BACKGROUND OF THE INVENTION

Field of the Invention

The present invention relates to a technique of setting a file name and the like for a scan image by using the result of character recognition on the scan image.

Description of the Related Art

Heretofore, a method that involves scanning a paper document to digitize the paper document has been widely used as a document management method. Moreover, there has been a technique that involves: performing an optical character recognition process (OCR process) on image data obtained by scanning a document for its digitization; and using characters thus recognized for the file name of the digitized document file. For example, Japanese Patent Laid-open No. 2016-024488 discloses a technique that involves: obtaining character strings by performing an OCR process on a scan image obtained by scanning a document; presenting the character strings with the scan image to the user; and using a character string selected by the user for the file name or the like of the scan image.

SUMMARY OF THE INVENTION

However, in Japanese Patent Laid-open No. 2016-024488, a character string selectable as a file name may possibly contain a character string which the user does not intend to use. In this case, after setting the file name by selecting the character string, the user has to delete the character string which he or she does not intend to use. Thus, the operation efficiency is not good.

The present invention provides a technique to enhance convenience for a user in a situation where the user sets the file name or the like of a scan image by using character strings obtained by performing an OCR process on the scan image.

An apparatus according to the present invention is an apparatus for performing a predetermined process on a scan image obtained by scanning a document, including: a display control unit configured to display a UI screen for performing the predetermined process, the UI screen being a screen on which unit blocks each assumed as a single continuous character string in the scan image are displayed in such a manner as to be selectable by the user; an OCR process unit configured to perform an OCR process on unit blocks selected by the user through the UI screen to thereby extract character strings; and a setting unit configured to set incidental information for the predetermined process by using the character strings extracted by the OCR process unit, in which the display control unit separates a character string satisfying a predetermined separation condition among the character strings extracted by the OCR process unit from the unit blocks selected by the user, and displays the separated character strings on the UI screen in such a manner that the separated character strings are selectable by the user.

Further features of the present invention will become apparent from the following description of exemplary embodiments with reference to the attached drawings.

BRIEF DESCRIPTION OF THE DRAWINGS

FIG. 10 is a diagram showing the relationship of FIGS. 10A and 10B;

FIG. 10A is a flowchart illustrating details of a file name generation process;

DESCRIPTION OF THE EMBODIMENTS

Embodiments of the present invention will be described below by using the drawings. Note that the following embodiments do not limit the invention according to the claims, and not all the combinations of features described in the embodiments are necessarily essential for the solution of the invention.

First Embodiment

<Configuration of Image Processing System>

Figure 1:
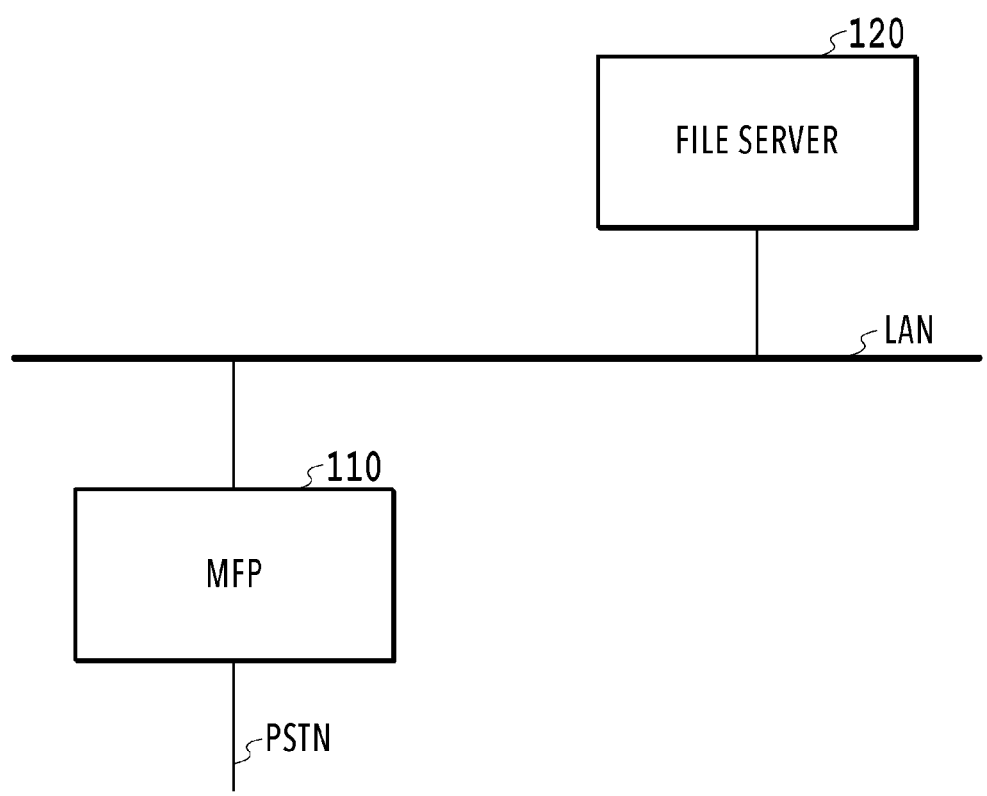
FIG. 1 is a diagram illustrating the overall configuration of an image processing system.

FIG. 1 is a diagram illustrating the overall configuration of an image processing system according to this embodiment. The image processing system includes an MFP 110 and a file server 120, which are communicatively connected to each other through a local area network (LAN).

The multi-function printer (MFP) 110 is a multi-functional having a plurality of functions such as the functions of a scanner and a printer and is an example of an image processing apparatus. The file server 120 is an example of an external server that stores and manages digitized document files. Although the image processing system in this embodiment includes the MFP 110 and the file server 120, the configuration is not limited to this. For example, the MFP 110 may also serve as the file server 120. Also, the MFP 110 and the file server 120 may be configured to be connected through the Internet or the like instead of an LAN. Also, the MFP 110 is connected to the public switched telephone networks (PSTN) and capable of faxing of image data to and from fax apparatuses (not illustrated).

<Hardware Configuration of MFP>

Figure 2:
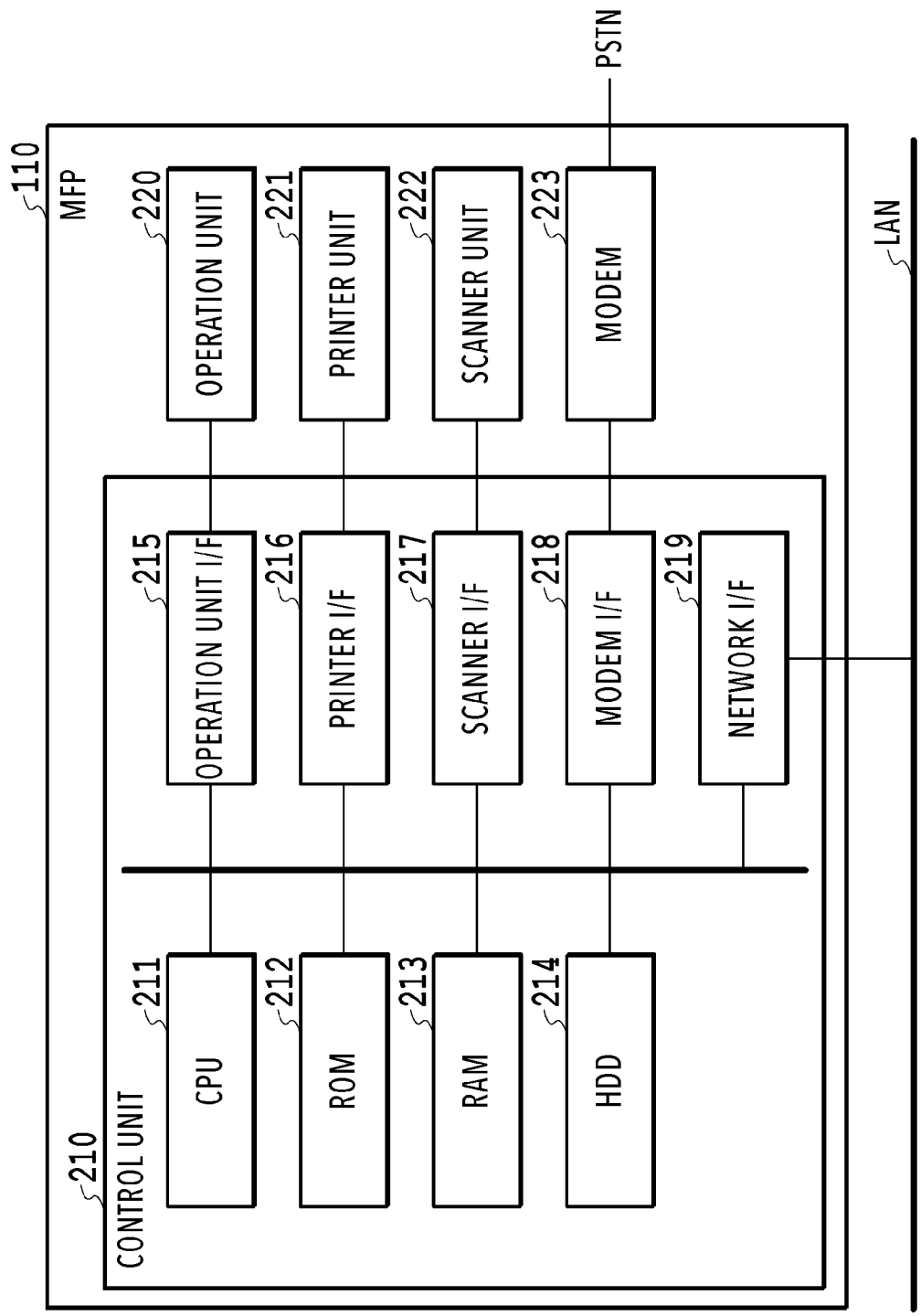
FIG. 2 is a hardware configuration diagram of an MFP.

FIG. 2 is a hardware configuration diagram of the MFP 110. The MFP 110 includes a control unit 210, an operation unit 220, a printer unit 221, a scanner unit 222, and a modem 223. The control unit 210 includes the following units 211 to 219 and controls the operation of the whole MFP 110. The CPU 211 reads out a control program stored in the ROM 212 and executes and controls various functions of the MFP 110 such as reading, printing, and communication. The RAM 213 is used as temporary storage areas such as a main memory and a work area for the CPU 211. Note that in this embodiment, a single CPU 211 uses a single memory (RAM 213 or HDD 214) to execute the processes illustrated in the flowcharts to be mentioned later. However, other configurations may be employed. For example, a plurality of CPUs and a plurality of RAMs or HDDs may cooperate with each other to execute the processes. The HDD 214 is a high-capacity storage unit that stores image data and various programs. The operation unit I/F 215 is an interface that connects the operation unit 220 and the control unit 210. The operation unit 220 is equipped with a liquid crystal display unit having a touchscreen function, a keyboard, and so on, and serves as a reception unit that receives user operations, inputs, and instructions. These user operations and the like may each be received as a touch on the liquid crystal panel or an operation of the keyboard, a button, or the like by the user. The printer I/F 216 is an interface that connects the printer unit 221 and the control unit 210. Image data to be printed is transferred from the control unit 210 to the printer unit 221 through the printer I/F 216 and printed onto a printing medium. The scanner I/F 217 is an interface that connects the scanner unit 222 and the control unit 210. The scanner unit 222 scans a document placed on a platen or auto document feeder (ADF) not illustrated to generate image data and inputs it into the control unit 210 through the scanner I/F 217. The MFP 110 can print and output (photocopy) the image data generated by the scanner unit 222 from the printer unit 221 and also transmit the image data as a file or email it. The modem I/F 218 is an interface that connects the modem 223 and the control unit 210. The modem 223 faxes image data to and from fax apparatuses on the PSTN. The network I/F 219 is an interface that connects the control unit 210 (MFP 110) to the LAN. The MFP 110 transmits image data and information to external apparatuses on the LAN (such as the file server 120) and receives various pieces of information therefrom by using the network I/F 219.

<Hardware Configuration of File Server>

Figure 3:
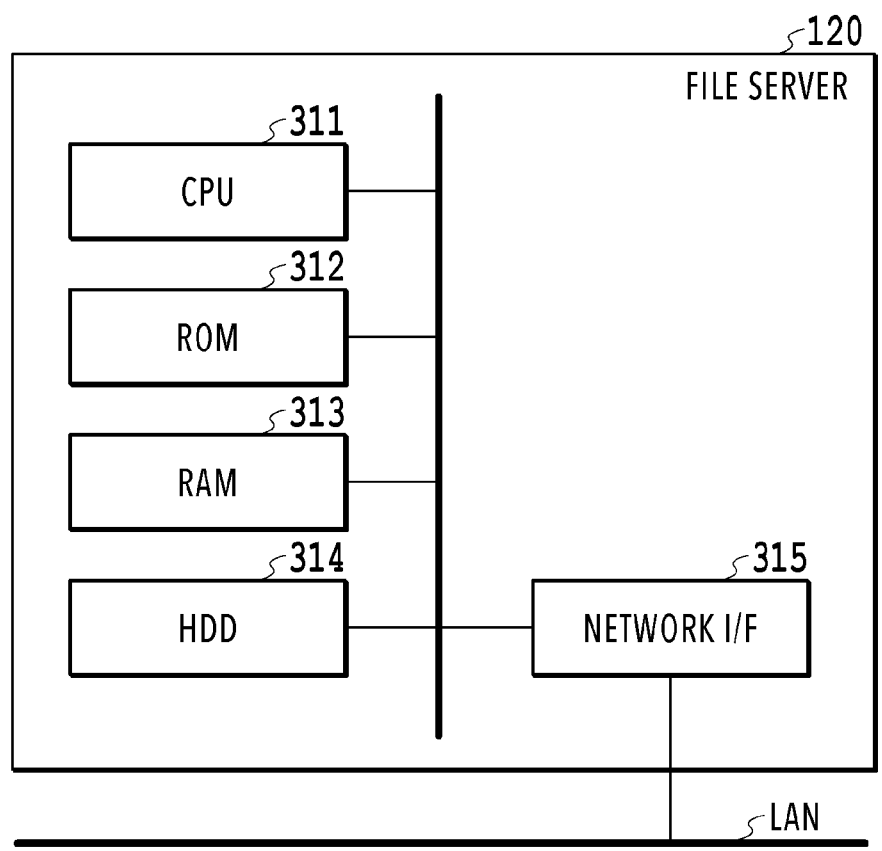
FIG. 3 is a hardware configuration diagram of a file server.

FIG. 3 is a hardware configuration diagram of the file server 120. The file server 120 includes a CPU 311, an ROM 312, an RAM 313, an HDD 314, and a network I/F 315. The CPU 311 controls the operation of the whole file server 120 by reading out a control program stored in the ROM 312 and executing various processes. The RAM 313 is used as temporary storage areas such as a main memory and a work area for the CPU 311. The HDD 314 is a high-capacity storage unit that stores image data and various programs. The network I/F 315 is an interface that connects the file server 120 to the LAN. The file server 120 transmits and receives various pieces of information to and from other apparatuses on the LAN (e.g. the MFP 110) by using the network I/F 315.

<Software Configuration of MFP>

Figure 4:
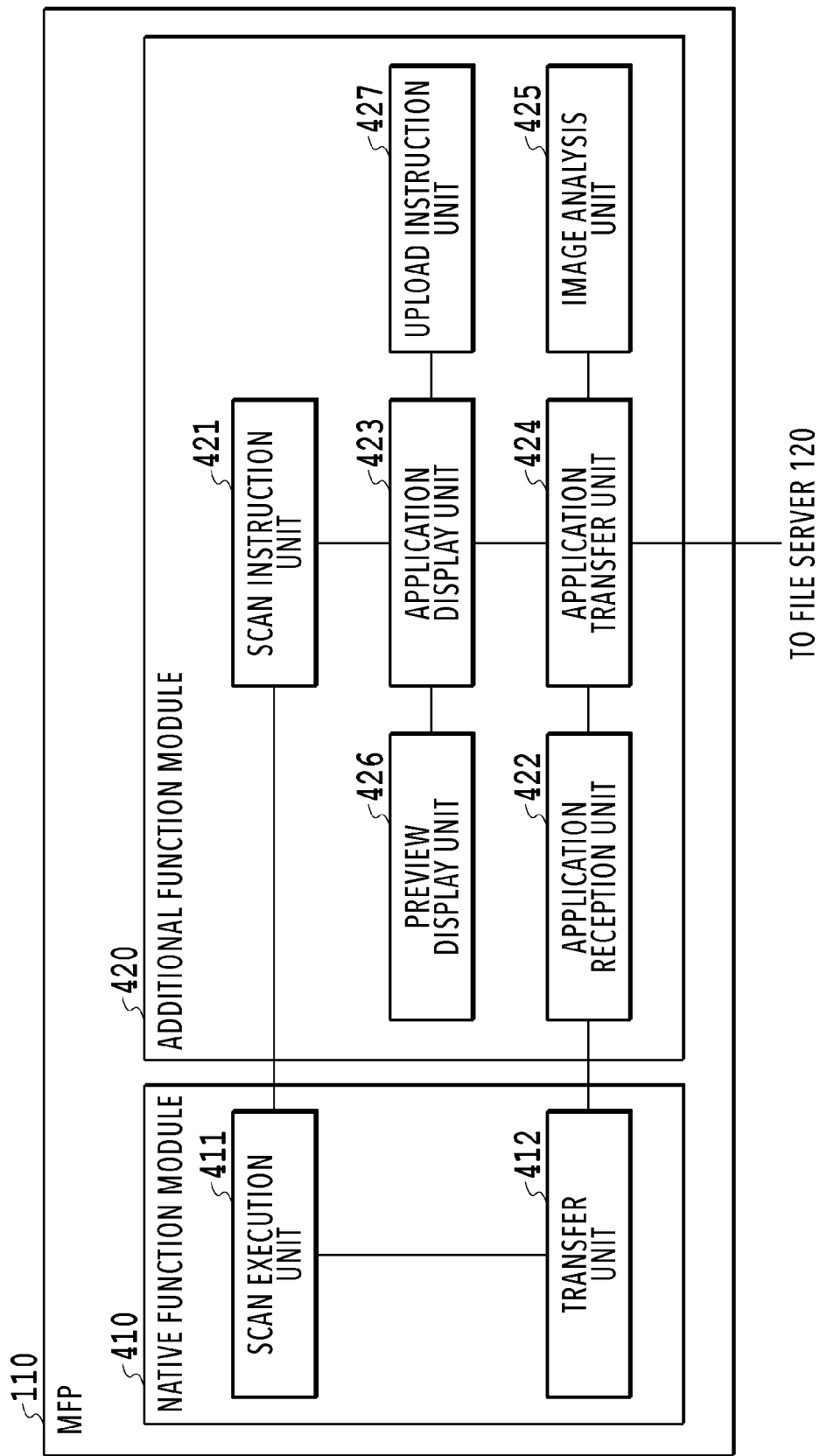
FIG. 4 is a software configuration diagram of the MFP.

FIG. 4 is a software configuration diagram of the MFP 110. Software of the MFP 110 is mainly divided into two modules, a native function module 410 and an additional function module 420. Each unit included in the native function module 410 is a function module which the MFP 110 is normally equipped with, whereas each unit included in the additional function module 420 is a function module which the MFP 110 is additionally equipped with and is a function module implemented by installing an application, for example. The additional function module 420 in this embodiment is a Java (registered trademark)-based application and allows functions to be easily added to the MFP 110. Note that other applications not illustrated may be installed in the MFP 110. The units constituting the function modules 410 and 420 will be described below.

An application display unit 423 performs display control for displaying UI screens for receiving various user operations on the touchscreen of the operation unit 220. Details of the UI screens to be displayed will be described later. A scan instruction unit 421 transmits a scan request containing information on scan settings and transfer settings to a scan execution unit 411 in accordance with a user instruction input through a UI screen to cause the scan execution unit 411 to execute a scan process. This scan request also contains a request ID for identifying whether image data to be received by a later-described application reception unit 422 is data as a response to this scan request.

Upon receipt of the scan request from the scan instruction unit 421, the scan execution unit 411 executes a scan process by controlling the scanner unit 222 through the scanner OF 217. As a result, a document is scanned and image data is generated. The image data generated by the scan (hereinafter, referred to as "scan image data") is passed to a transfer unit 412 along with transfer identification information that identifies the transfer destination of the scan image data. The transfer unit 412 transfers the scan image data received from the scan execution unit 411 in accordance with the transfer settings. The transfer destination of the scan image data can be set to the file server 120, a PC on the LAN (not illustrated), or the like. Note that in this embodiment, there is a setting by which any scan image data generated by the scan execution unit 411 is all transferred firstly to the additional function module 420. The transfer unit 412 has a File Transfer Protocol (FTP) client function and transfers the scan image data with FTP to the application reception unit 422, which has an FTP server function.

The application reception unit 422 receives the scan image data internally transferred from the transfer unit 412 and passes it to an application transfer unit 424. The application transfer unit 424 passes the received scan image data to an image analysis unit 425.

The image analysis unit 425 performs an image analysis process such as identification of character string blocks, recognition of character strings, and identification of the orientation of the text on the received scan image data. Then, the scan image data and the analysis result are passed to a preview display unit 426 through the application transfer unit 424. Based on the scan image data and the analysis result, the preview display unit 426 performs display control such as generation of a preview screen, which is a UI screen, for the user to set the file name and display of the preview screen on the touchscreen of the operation unit 220. Details of the preview screen to be displayed will be described later.

An upload instruction unit 427 generates a UI screen for the user to set a folder path and displays it on the touchscreen of the operation unit 220. The application transfer unit 424 transfers (transmits) the scan image data to the file server 120. After finishing the transfer, the application transfer unit 424 notifies the application display unit 423 that the transfer has been finished. Upon receipt of the notification from the application transfer unit 424, the application display unit 423 updates the displayed contents. Also, the application transfer unit 424 has a Server Message Block (SMB) client function. Thus, using SMB, the application transfer unit 424 performs file operations and folder operations on the file server 120, which has an SMB server function. Note that the protocol to be used is not limited to SMB but may be WebDAV, FTP, SMTP, or the like. Also, a protocol designed for a purpose other than file transmission, such as SOAP or REST, can be used as well.

Figure 5:
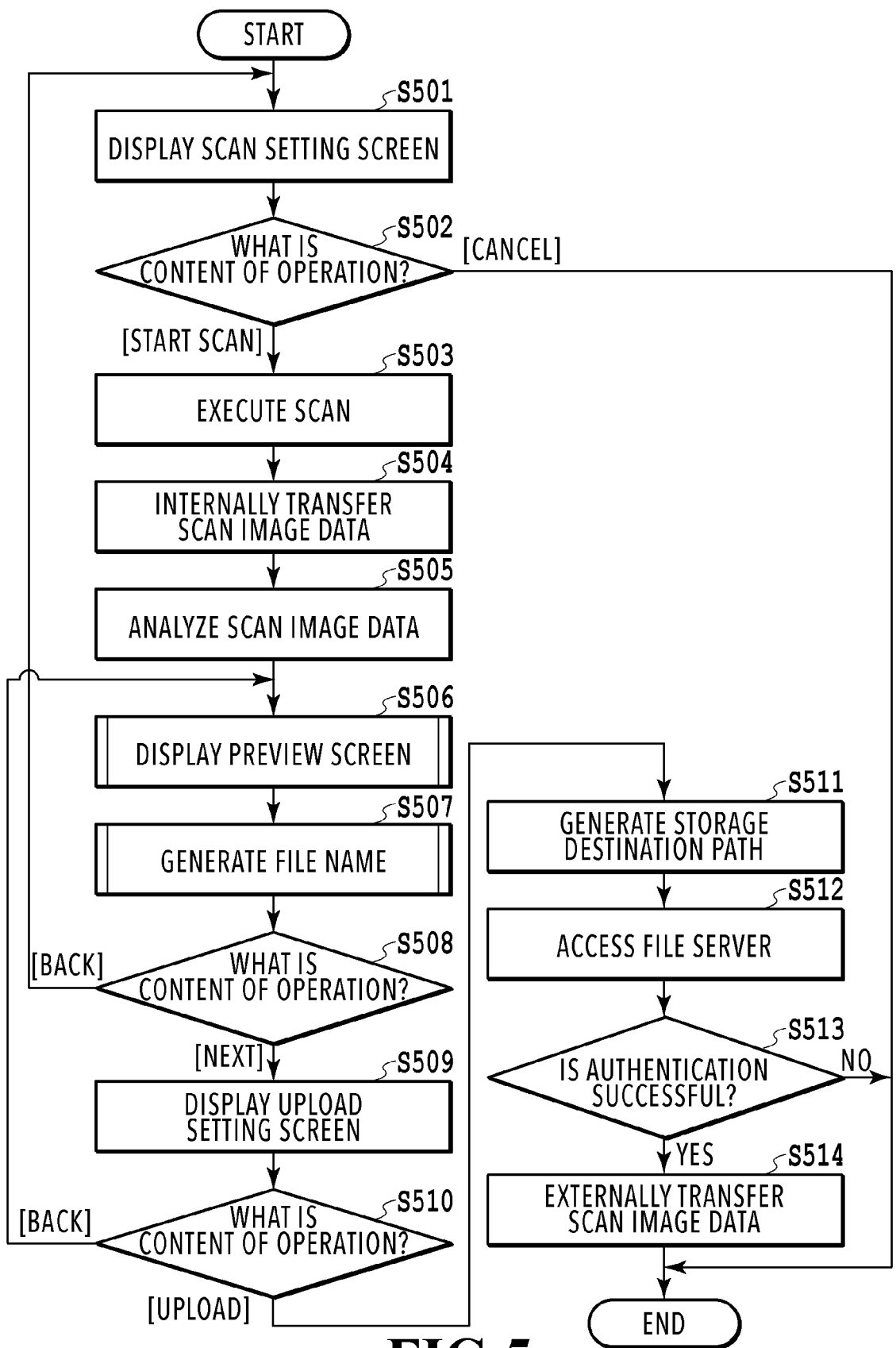
FIG. 5 is a flowchart illustrating the flow of operation control from generation to upload of a scan image.

Next, description will be given of operation control performed in the MFP 110 to generate scan image from a document and upload it to the file server 120. FIG. 5 is a flowchart illustrating the flow of the control from the generation to the upload of the scan image data. This series of processes is implemented by the control unit 210 executing a control program stored in the HDD 214. Details will be described below. Note that in the following, the symbol S means a step in the flowchart.

Figure 6:
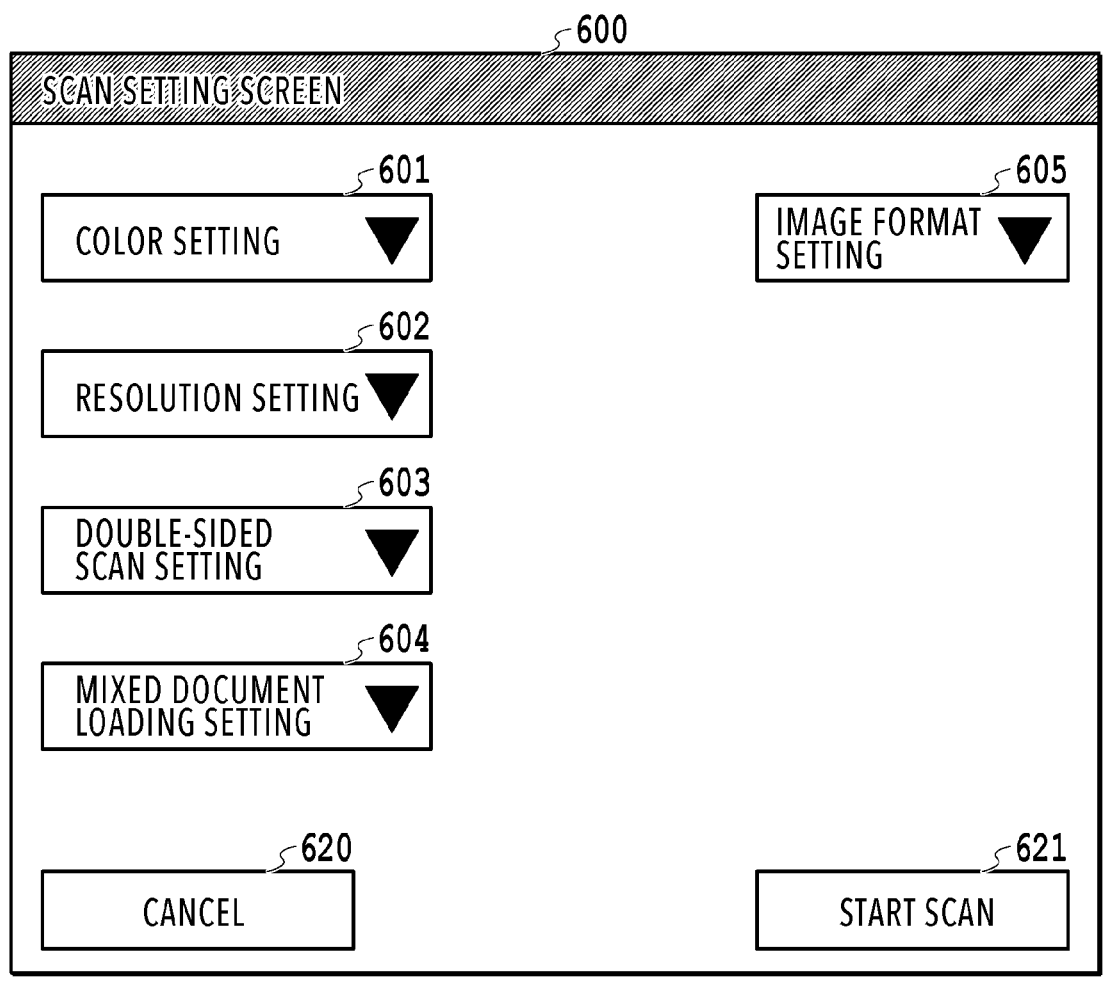
FIG. 6 is a diagram illustrating an example of a scan setting screen.

In S501, the application display unit 423 displays a UI screen for determining various settings for a scan process (hereinafter, referred to as "scan setting screen") on the touchscreen of the operation unit 220. FIG. 6 is a diagram illustrating an example of the scan setting screen. In a scan setting screen 600 in FIG. 6, there are five setting buttons 601 to 605. The [COLOR SETTING] button 601 is a button for setting a color mode or a monochrome mode for scan of a document. The [RESOLUTION SETTING] button 602 is a button for setting the resolution of scan of a document. The [DOUBLE-SIDED SCAN SETTING] button 603 is a setting button used in a case where both sides of a document are desired to be scanned. The [MIXED DOCUMENT LOADING SETTING] button 604 is a setting button used in a case where documents of different sizes are desired to be scanned together. The [IMAGE FORMAT SETTING] button 605 is a setting button used to select the format in which to store the scan image data. In determining settings with these setting buttons 601 to 605, settable candidates (choices) are displayed within the respective ranges supported by the MFP 110, and the user selects desired candidates from among the displayed candidates. Note that the setting buttons mentioned above are a mere example. Not all of the above setting items may be employed and/or setting items other than these may be employed. The user also determines detailed settings for a scan process with this scan setting screen 600. A [CANCEL] button 620 is a button used to cancel the scan setting. A [START SCAN] button 621 is a button for issuing an instruction to start the scan process on the document placed on the platen or the like.

In S502, the application display unit 423 branches the processing based on the content of the user's button operation. In a case where the [START SCAN] button 621 is detected to be pressed, the application display unit 423 informs the scan instruction unit 421 of the contents set by the setting buttons 601 to 605 and the receipt of an instruction to start executing the scan process. On the other hand, the process is terminated in a case where the [CANCEL] button 620 is detected to be pressed.

In S503, the scan execution unit 411 executes the scan process in response to the instruction from the scan instruction unit 421. In S504, the scan image data thus obtained is internally transferred with FTP to the application reception unit 422 through the transfer unit 412, and further sent to the image analysis unit 425 through the application transfer unit 424.

In S505, the image analysis unit 425 executes an analysis process on the scan image data. Specifically, the image analysis unit 425 firstly corrects the scan image data into a state where the analysis process can be easily performed, by performing image signal binarization, correction of the skew of the document misaligned during the scan, rotation in such a direction as to make the document upright, and so on. The image analysis unit 425 then performs edge extraction on the corrected scan image (binarized image) to identify character string blocks in the image, i.e. chunks (unit blocks) each assumed as a single continuous character string. The image analysis unit 425 thereafter analyzes the character strings on a unit block basis. Table 1 below illustrates an example of the result of performing the image analysis process on part of a scan image of a quotation.

TABLE 1

| No. | X Coordinate of Block | Y Coordinate of Block | Width of Block | Height of Block | Character String in Block |
|---|---|---|---|---|---|
| 1 | 55 | 5 | 20 | 10 | Quotation |
| 2 | 5 | 20 | 30 | 5 | Tokyo Corporation |
| 3 | 38 | 20 | 10 | 5 | To: |
| 4 | 78 | 20 | 50 | 5 | Quotation No.: R-1234 |
| 5 | 5 | 35 | 23 | 5 | Desired Delivery Date |
| 6 | 5 | 45 | 33 | 5 | Apr. 14, 2017 |
| 7 | 75 | 40 | 30 | 5 | Yokohama Corporation |
| 8 | 75 | 50 | 43 | 5 | 1000-1 Yokohama |

In table 1, [No.] indicates numbers uniquely representing the identified character string blocks. In this example, serial numbers 1 to 8 are given in the order of recognition. Coordinates are defined such that the upper left corner of a preview area 710 is the origin (0, 0), from which the X axis extends rightward and the Y axis extends downward. [X Coordinate of Block] indicates the X coordinate of the upper left corner of each identified character string block. [Y Coordinate of Block] indicates the Y coordinate of the upper left corner of each identified character string block. In the following, the "coordinates" of a character string block mean the positional coordinates of the upper left corner of the character string block, unless otherwise noted. [Width of Block] indicates the distance from the left edge to the right edge of each identified character string block. [Height of Block] indicates the distance from the upper edge to the lower edge of each identified character string block. In this embodiment, [X Coordinate of Block], [Y Coordinate of Block], [Width of Block], and [Height of Block] are each indicated in pixels but may be indicated in points, inches, or the like. Information on each character string block extracted from the scan image (hereinafter, referred to as "character string block information") is passed to the application transfer unit 424 as image analysis data. Here, the information on each character string may contain coordinate information on each single character of the character string as well.

The image analysis data is in a format such as CSV or XML but may be in a different format. Also, the image analysis data may be first stored in the HDD 214 and then passed in a predetermined timing.

Figure 7A:
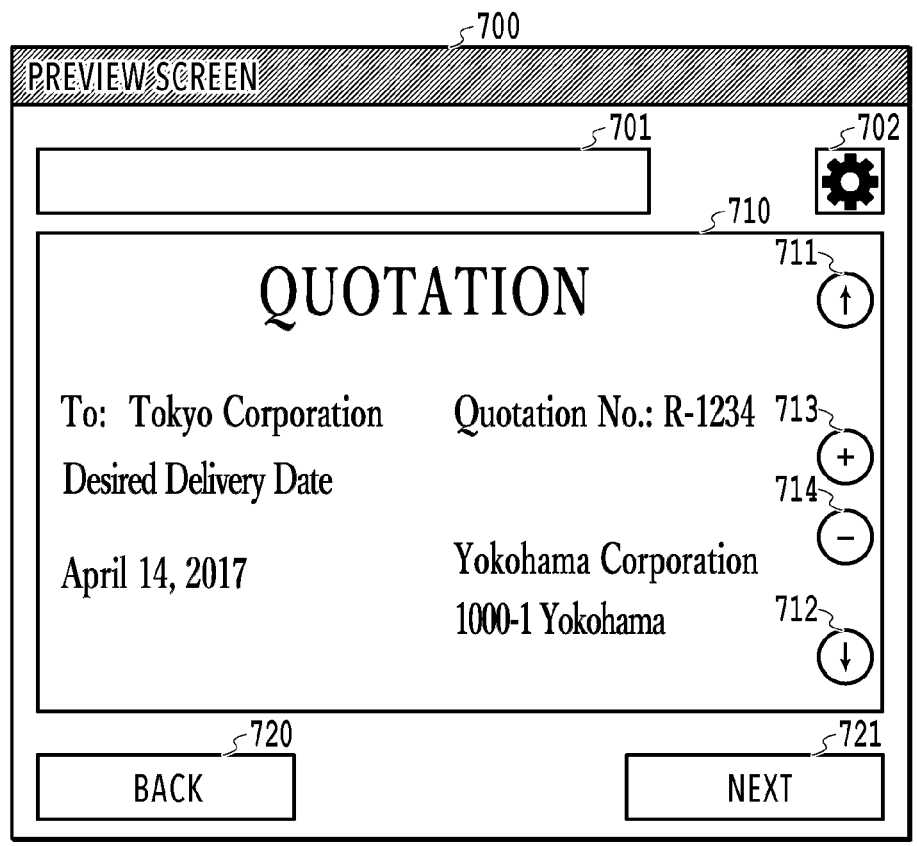
FIG. 7A and FIG. 7B are diagrams illustrating an example of a preview screen.
Figure 7B:
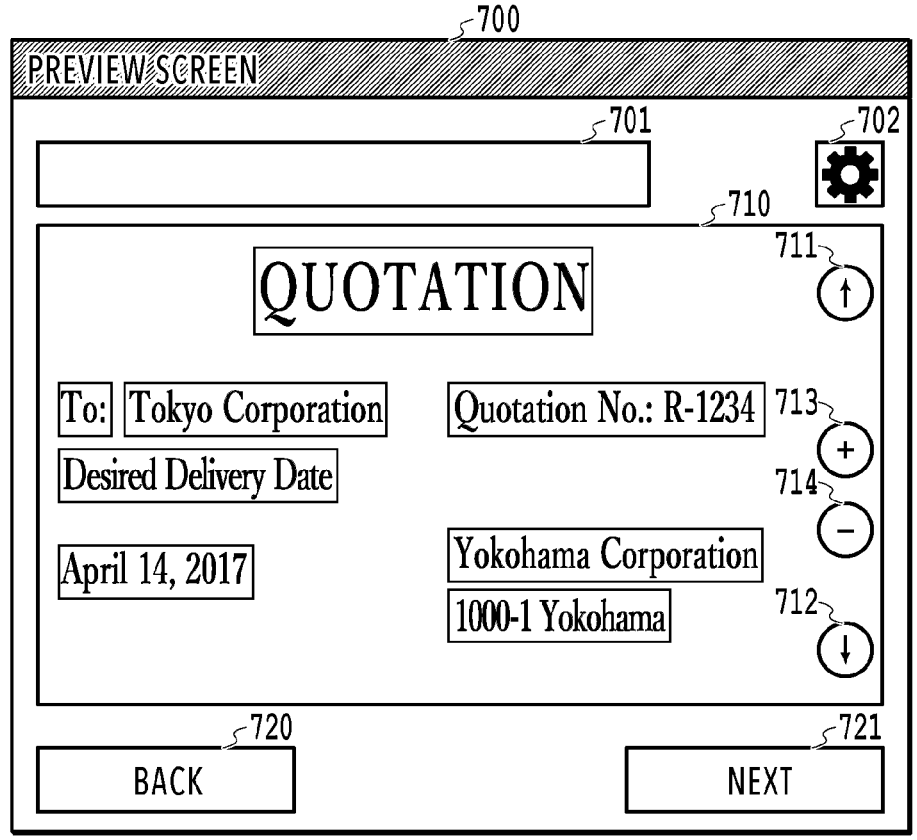

In S506, the application transfer unit 424 displays a preview of the scan image read in S503 on the touchscreen of the operation unit 220. This image data displayed as a preview is generated and provided by the application display unit 423. The user can set the file name of the scan image data through the UI screen displaying the preview of the scan image (hereinafter, referred to as "preview screen"). FIG. 7A is a diagram illustrating an example of the preview screen. On a preview screen 700, inside a preview area 710 at the center of the screen, the scan image and a plurality of buttons 711 to 714 for changing its display state are displayed. The buttons 711 and 712 are buttons that appear in a case where the entire scan image cannot be displayed, and are buttons with which to vertically scroll the displayed area. Usually, the touchscreen of the MFP 110 is not very large. Thus, for example, in a case where the scan image is an image obtained by scanning an A4 portrait, horizontal writing document, an initial setting is determined such that the scan image is reduced in size to be perfectly fit in the preview area 710 in the width direction (horizontal direction) and displayed from its very top. In other words, with the initial setting, a lower portion of an A4 portrait scan image is not displayed within the preview area 710. Pressing the "↓" button 712 in such a state can scroll down the displayed area and display a lower portion. Further, in a case where the scan image is, for example, an A4 landscape scan image, an A3 scan image, or the like, buttons for horizontally scrolling the displayed area may be further provided. Buttons 713 and 714 are buttons for enlarging and reducing the displayed area. Pressing the "+" button 713 zooms in the displayed area while pressing the "−" button 714 zooms out the displayed area. The operations based on these button operations may be implemented by operations with the user's fingers such as swiping, pinching out, and pinching in on the preview screen. Also, the character blocks identified by the image analysis process in S505 are displayed in the preview area 710 based on the above-mentioned character string block information in such a manner as to be recognizable by the user. FIG. 7B is a diagram illustrating a state where each character string block on the preview screen 700 in FIG. 7A is displayed in a recognizable manner by an enclosing box. Details of a character string block display process will be described later. As the user selects (for example, touches with a finger) a desired character string block from among the character string blocks displayed in the preview area 710, the character string in that block is displayed in a file name entry field 701, that is, automatically entered into the file name entry field 701, and becomes a part of the character string constituting the file name. A [BACK] button 720 is a button used to cancel the preview display. A [NEXT] button 721 is a button for proceeding to a screen for setting the upload destination of the read scan image data. Also, a button 702 is a button for setting the file name format and so on. Note that the above-described types of buttons and the above-described manners in which the character string blocks are displayed and selected are a mere example. The present invention is not limited to these. For example, there may also be a button for correcting and changing the character string displayed in the file name entry field 701, and/or a button for fixing the file name.

Figure 8:
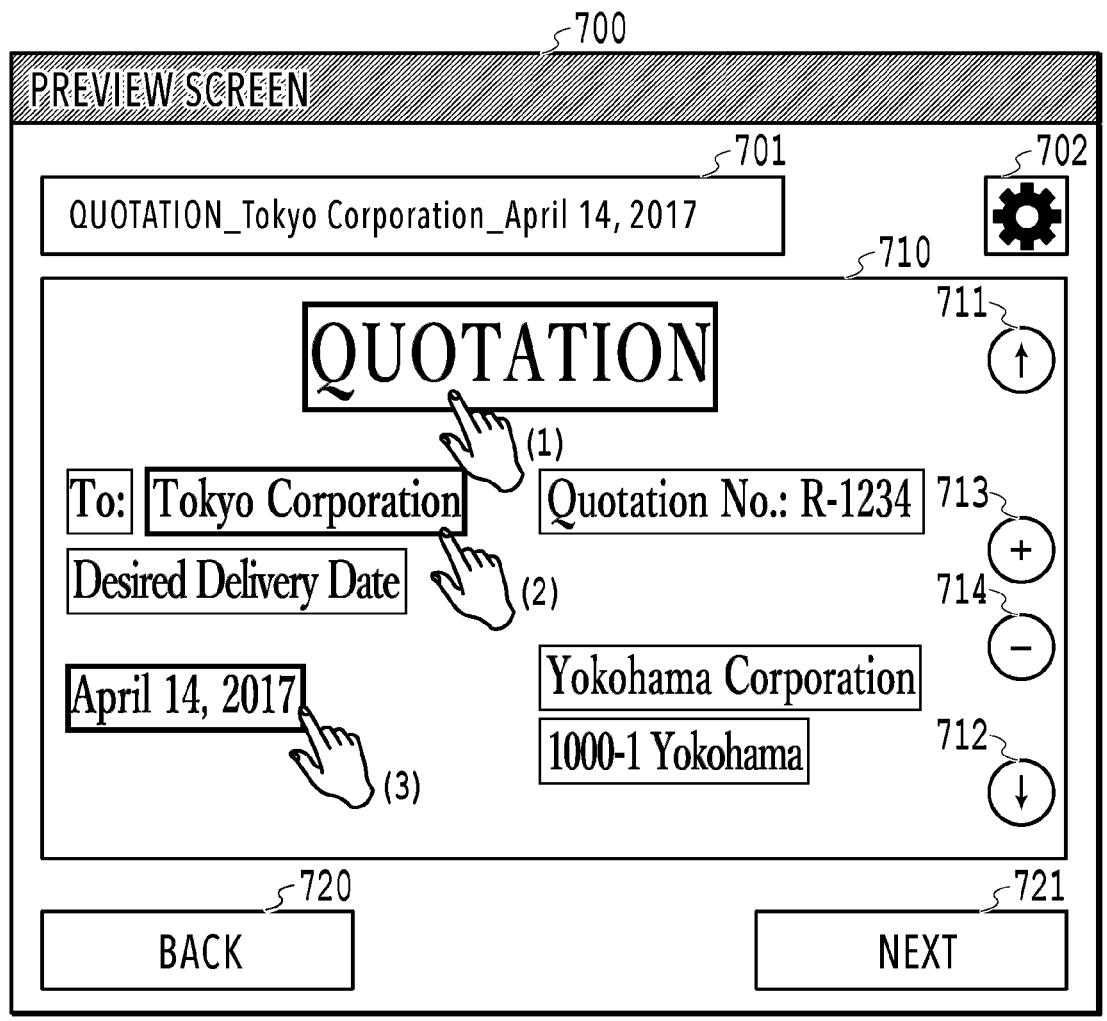
FIG. 8 is a diagram illustrating a state where a file name has been generated on the preview screen.

In S507, the preview display unit 426 generates a file name for the read scan image. FIG. 8 illustrates the state of the preview screen 700 after a file name is generated. In this example, the character string blocks with "QUOTATION", "Tokyo Corporation", and "Apr. 14, 2017" are sequentially selected, so that a character string "QUOTATION_Tokyo Corporation_Apr. 14, 2017" is displayed and set in the file name entry field 701. Moreover, in the preview area 710, the boxes around the character string blocks that have received the user's touch operation have been changed to boxes with bold lines to indicate that the blocks have been selected as parts of the file name. Details of this file name generation process will be described later. As the user presses the [NEXT] button 721 after a desired file name is generated, the processing proceeds to S508.

In S508, as in S502, the preview display unit 426 branches the processing based on the content of the user's button operation. In a case where the [NEXT] button 721 is detected to be pressed, the information of the file name displayed in the file name entry field 701 (the character string set as the file name) is sent to the upload instruction unit 427, and the processing proceeds to S509. On the other hand, in a case where the [BACK] button 720 is detected to be pressed, the processing returns to S501 (displaying the scan setting screen).

Figure 9:
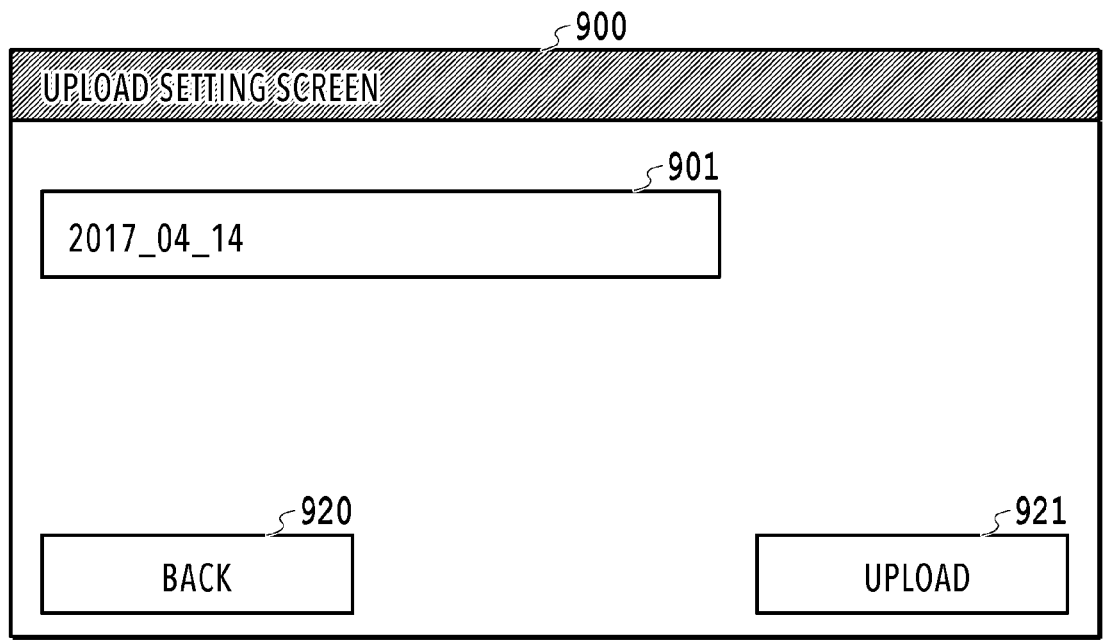
FIG. 9 is a diagram illustrating an example of an upload setting screen.

In S509, the upload instruction unit 427 displays a UI screen for setting the transfer destination of the scan image data (hereinafter, referred to as "upload setting screen") on the touchscreen of the operation unit 220. Through this upload setting screen, the user determines advanced settings for the upload to the file server 120. FIG. 9 is a diagram illustrating an example of the upload setting screen. The user enters the name of the folder path (path name) for external transfer to the filer server 120 to a [folder path] entry field 901. In the example of FIG. 9, "2017_04_14" is entered as the path name. Examples of the entry method include a method including: displaying a sub-window (not illustrated) with a keyboard screen in response to a tap operation on the [folder path] entry field 901; and having the user to enter the path name with the keyboard screen. Alternatively, the path name may be selected and set from an address list held in the HDD 214. A [BACK] button 920 is a button used to cancel the determination of the advanced settings for the upload. An [UPLOAD] button 921 is a button for instructing upload to the folder path set in the [folder path] entry field 901.

In S510, as in S508, the upload instruction unit 427 branches the processing based on the content of the user's button operation. The processing proceeds to S511 in a case where the [UPLOAD] button 921 is detected to be pressed. In this case, the path name entered to the [folder path] entry field 901, the file name generated in S507, and file server settings are information necessary for storing the scan image data in the file server 120. Specifically, they include information such as the host name, the start point of the folder path, and a login user name and password. On the other hand, in a case where the [BACK] button 920 is detected to be pressed, the processing returns to S506 (displaying the preview screen).

In S511, the application transfer unit 424 generates a storage destination path for the scan image data based on the information received from the upload instruction unit 427. Specifically, the path is generated by adding the folder path to the file server settings (the host name of the file server 120, the start point of the folder path). As a result, a storage destination path like "¥¥server01¥Share¥2017_04_14" is generated. Then, in S512, the application transfer unit 424 accesses the file server 120. In doing so, the application transfer unit 424 transmits the user name and password contained in the file server settings to the file server 120. Upon receipt of the user name and password, the file server 120 executes an authentication process.

In S513, the application transfer unit 424 branches the processing based on the result of the authentication by the file server 120. Specifically, the processing proceeds to S514 in a case where a notification of authentication success is received from the file server 120. On the other hand, the processing is terminated in a case where a notification of authentication failure is received.

In S514, the application transfer unit 424 externally transfers the scan image data to the folder indicated by the storage destination path generated in S511 to store the scan image data in the file server 120.

The above is the content of the operation control from the generation to the upload of a scan image according to this embodiment. Note that this embodiment assumes that the processes of S505 to S507 are performed on single-page image data generated by a scan. The MFP 110 may also be configured to be capable of, for example: providing a button for performing the image analysis on the next page within the preview screen 700; displaying a preview of the next page obtained by that analysis; and setting a character string(s) constituting the file name from among the character string blocks in the next and subsequent pages.

<Generation of File Name>

Figure 10B:
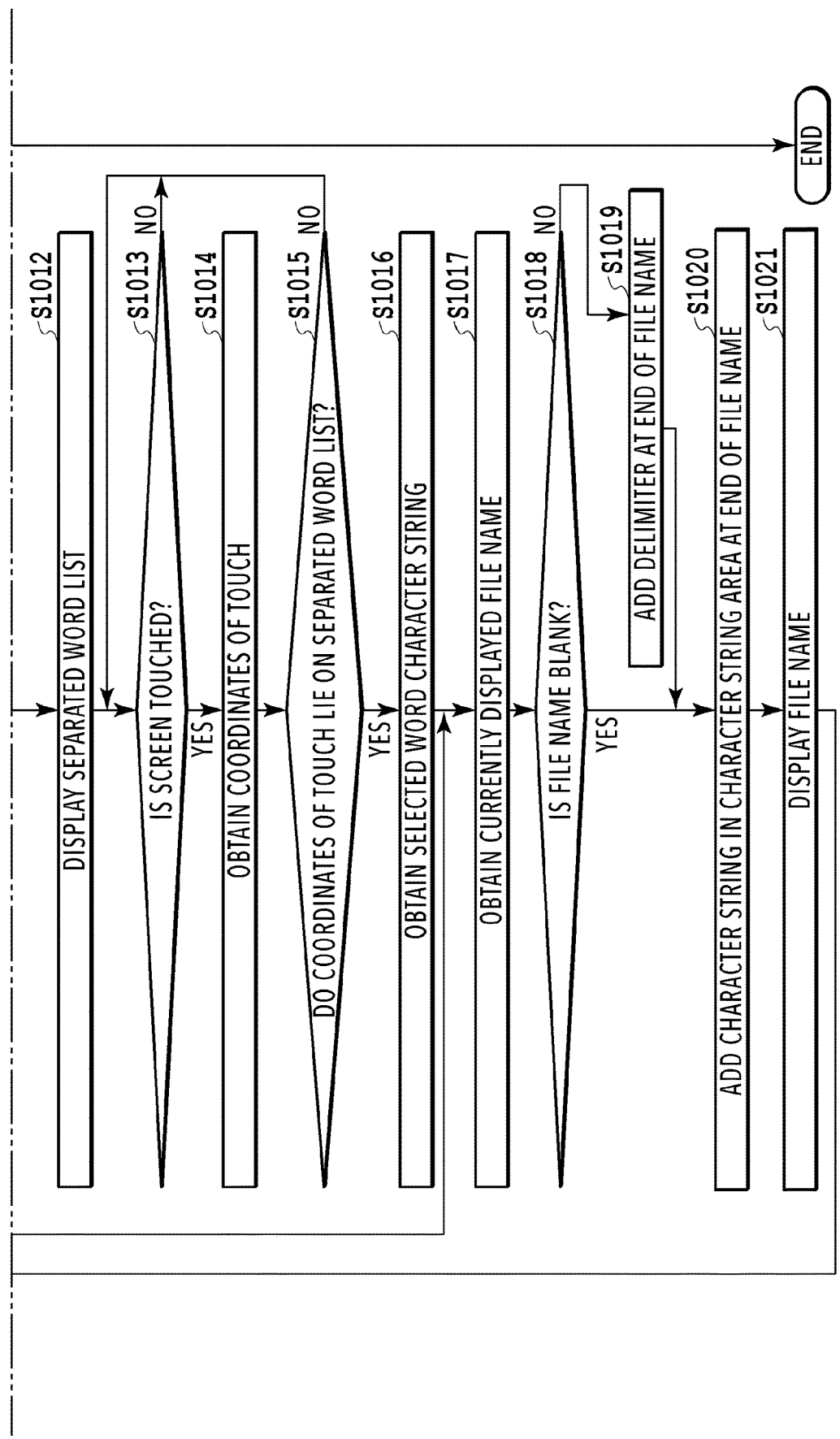
FIG. 10B is a flowchart illustrating details of a file name generation process.

FIG. 10 is a flowchart illustrating details of the file name generation process (S507) by the preview display unit 426. Description will be given below along the flow in FIG. 10.

In S1001, whether or not there is a touch operation by the user on the preview screen 700 displayed on the touchscreen is monitored. The processing proceeds to S1002 in a case where a touch operation is detected. Thereafter in S1002, the processing is branched based on the content of the touch operation. The processing is terminated in a case where the content of the touch operation is pressing of the [NEXT] button 721 or the [BACK] button 720. The processing proceeds to S1003 in a case where the content of the touch operation is not pressing of the [NEXT] button 721 or the [BACK] button 720.

In S1003, the positional coordinates (x, y) of the touch operation on the touchscreen are obtained. Thereafter in S1004, it is determined whether the positional coordinates of the touch operation lie on any character string block. For example, the determination is made based on whether the positional coordinates of the touch operation are within any of the character string blocks displayed in the preview area 710 (within any of the rectangles identified by the positional coordinates indicating the four corners of the character string blocks). In a case where the positional coordinates of the touch operation lie on any of the character string blocks, the processing proceeds to S1005. On the other hand, in a case where the positional coordinates of the touch operation do not lie on any of the character string blocks, the processing returns to S1001.

In S1005, the character string in the character string block lying on the positional coordinates of the touch operation is obtained. The character string is obtained by having the image analysis unit 425 execute an OCR process on the character string block selected by the touch operation (hereinafter, referred to as "selected character string block") to thereby extract the character string.

In S1006, the preview display unit 426 separates the extracted character string information on a word-by-word basis. The conditions for the separation of the character string is not limited. For example, a particular character, such as a space or the colon, contained in the character string may be used as a delimiter to separate the character string into a plurality of words. Alternatively, morphological analysis may be used to separate the character string by word class and a plurality of words (a plurality of nouns) may be taken out.

In S1007, the preview display unit 426 determines whether there are a plurality of separated words, that is, whether the character string has been separated. In a case where there are a plurality of separated words, the processing proceeds to S1008 and S1008 to S1011 will be iterated as many times as the number of separated words. In a case where the character string has not been separated, the processing proceeds to S1017.

In S1008, the preview display unit 426 determines one separated word from among the plurality of separated words obtained in S1006.

In S1009, the preview display unit 426 obtains the coordinates, height, and width of the separated word determined in S1008. The coordinates, height, and width of the separated word may be calculated from the coordinates of its characters obtained from the image analysis unit 425 or calculated from the coordinates of the character string block and the number of characters therein.

In S1010, the preview display unit 426 adds the separated word to a separated word list (choice list). Here, the separated word is added to the separated word list in accordance with a display condition. As the display condition, it is possible to use, for example, a condition involving calculating the distance between the coordinates of the touch and the coordinates of the separated word and adding the separated word to the separated word list in accordance with the distance. On the separated word list, the separated word closest to the coordinates of the touch is displayed at the top while the separated word farthest from the coordinates of the touch is displayed at the bottom, for example. The separated word list with separated words displayed in accordance with such a display condition reflects the intention of the user's selection and therefore enhances the convenience in selecting words. In a method of determining the distance to the coordinates of the touch, for example, a numerical value obtained by calculating the distance between the central coordinates of the separated word and the coordinates of the touch is registered in the separated word list table along with the separated word and is added in ascending order of the numerical value of the distance. Here, the whole character string in the selected character string block (number 2 in table 2) and its central coordinates may be initially added together when the separated word list is generated. Table 2 below illustrates an example of a separated word list table with separated word information added thereto.

TABLE 2

| No. | Separated Word | Distance to Coordinates of Touch |
|---|---|---|
| 1 | R-1234 | 3 |
| 2 | Quotation No.: R-1234 | 15 |
| 3 | Quotation No. | 40 |

In S1011, the preview display unit 426 determines whether there is any separated word yet to be processed. In a case where there is a separated word yet to be processed, the processing returns to S1008 and the processes of S1008 to S1010 will be performed. On the other hand, in a case where there is no separated word yet to be processed, the processing proceeds to S1012.

Figure 11:
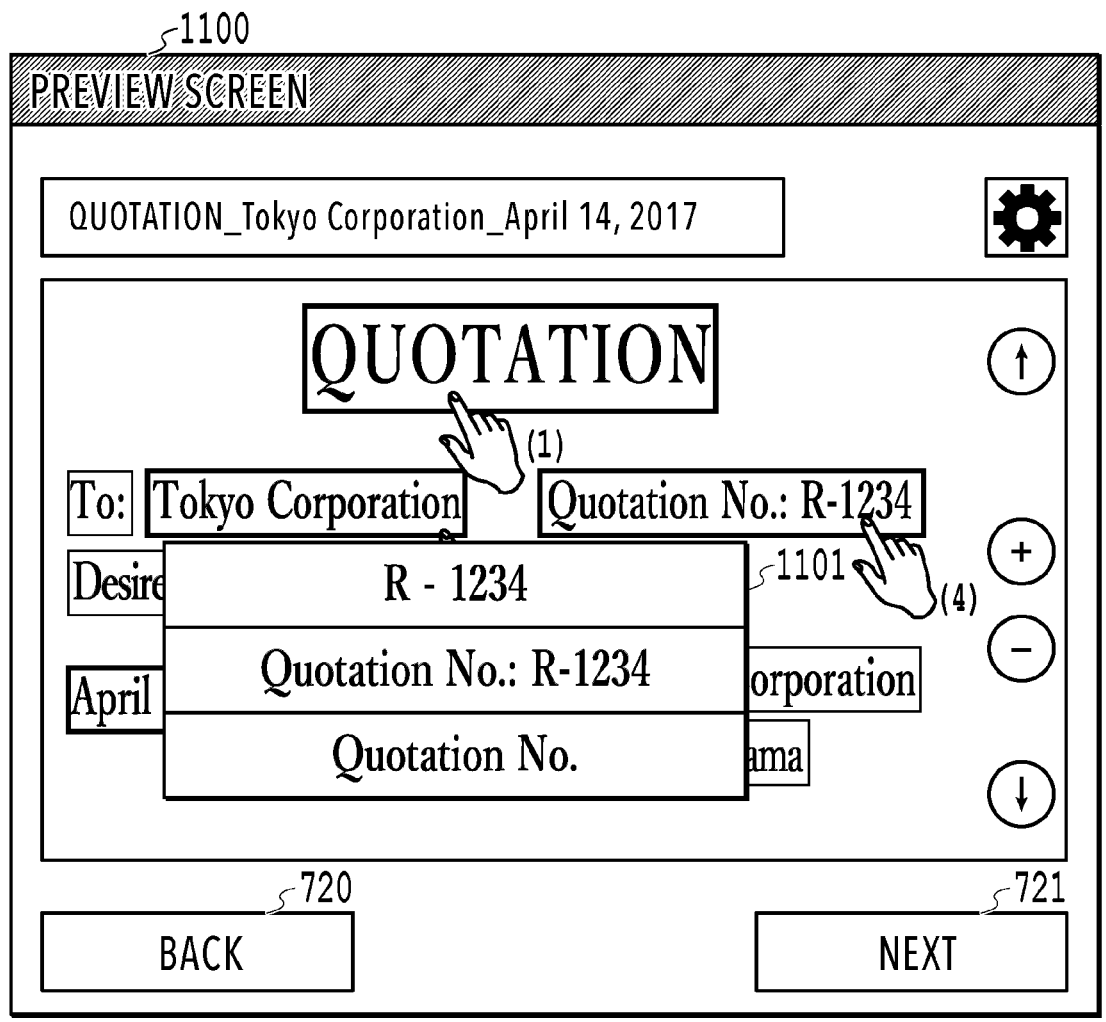
FIG. 11 is a diagram illustrating an example of a separated word list.

In S1012, the preview display unit 426 displays the separated word list on the preview screen. As the separated word list, it is possible to use, for example, a table which, in the case where the character string is formed of a plurality of words, displays each of the plurality of words in such a manner that the user can recognize one of the plurality of words. FIG. 11 is a diagram illustrating a state where a separated word list for the character string block "Quotation No.: R-1234" is displayed. As the separated word list for the character string block "Quotation No.: R-1234", separated word buttons 1101 with "R-1234", "Quotation No.: R-1234", and "Quotation No." are displayed in the preview area 710 in such a manner as to be individually recognizable to the user.

In S1013, the preview display unit 426 monitors whether or not there is a touch operation by the user on the preview screen 700 displayed on the touchscreen. The processing proceeds to S1014 in a case where a touch operation is detected. Thereafter in S1014, the preview display unit 426 obtains the positional coordinates (x, y) of the touch operation on the touchscreen.

In S1015, the preview display unit 426 determines whether the positional coordinates of the touch operation lie on any of the separated word buttons 1101, which are displayed in the separated word list. For example, the preview display unit 426 makes the determination based on whether the positional coordinates of the touch operation are within one of the separated word buttons 1101 (within one of the rectangles identified by the positional coordinates indicating the four corners of rectangles). In a case where the positional coordinates of the touch operation lie on one of the separated word buttons 1101, the processing proceeds to S1016. On the other hand, in a case where the positional coordinates of the touch operation do not lie on any of the separated word buttons 1101, the processing returns to S1013.

In S1016, the preview display unit 426 obtains the word character string displayed on the one separated word button lying on the positional coordinates of the touch operation and selected by the touch operation. Then in S1017, the file name currently displayed in the file name entry field 701 is obtained. Thereafter in S1018, it is determined whether the content of the obtained file name is "blank". Here, the file name being "blank" means a blank state where no character string is displayed in the file name entry field 701. In a case where the obtained file name is "blank", the processing proceeds to S1020 On the other hand, in a case where the obtained file name is not "blank", the processing proceeds to S1019.

In S1019, a process of adding a predetermined delimiter at the end of the file name obtained in S1016 is performed. The description will be given here based on an example where the predetermined delimiter is the underscore, but the predetermined delimiter is not limited to it. For example, the predetermined delimiter may be a symbol or character other than the underscore such as the hyphen or may even be something insubstantial such as a space.

In S1020, the character string obtained in S1016 (character string extracted from the selected character string block) is set as a constituent element of the file name. Here, in a case where an already set character string is present, the character string obtained in S1016 is added at the end of the already set character string. Wherein, if a prohibition letter (e.g. "/", "?", "*") which is not allowed to use for a file name in an operating system is included in the character string obtained in S1016, the prohibition letter may be replaced with a predetermined letter (e.g. space character). And the character string in which the prohibition letter has been replaced with the predetermined letter is added at the end of the already set character string in S1020. In addition, an example replacing the prohibition letter in S1020 in this embodiment, but the timing to replace the prohibition letter is not limited in S1020. For example, when the separated word list is displayed in S1012, character strings in which the prohibition letter has been replaced with the predetermined letter may be displayed as the separated words of the separated word list. In S1021, the currently set character string is displayed in (automatically entered into) the file name entry field 701.

The above is the content of the file name generation process. In such a process, the file name of a scan image is generated by inserting a delimiter between a plurality of character strings selected by the user. A character string extracted from a character string block selected by the user and separated words obtained by separating the character string in accordance with a predetermined separation condition are displayed on a UI screen in such a manner as to be individually recognizable to the user. Thus, in a situation where the user sets the file name of a scan image by using character strings obtained by performing an OCR process on the scan image, the user can enter a character string which he or she intends to use by a touch operation(s) as part of the file name. This enhances convenience for the user.

This embodiment has been described by taking, as an example, a situation where the file name of a scan image is set using the result of character recognition on character string blocks in the scan image. However, the scope of application of the present invention is not limited to file name setting situations. For example, the present invention may be applied to the setting of the name of a folder as a storage destination of the scan image data, the setting of a data transfer destination such as an upload destination of the scan image, and the setting of a faxing or emailing destination. In such a case, for example, on an upload setting screen 900 in FIG. 9 mentioned earlier, the result of the character recognition on the character string blocks in the scan image may be displayed in a selectable manner as folder path candidates, and the path name may be set in accordance with what the user selects. Also, on a destination setting screen not illustrated, the result of the character recognition on the character string blocks in the scan image may be displayed in a selectable manner as fax number or email address candidates, and a fax number or email address may be set in accordance with what the user selects. As described above, the present invention is widely applicable to situations where various kinds of information on a scan image (incidental information) are set besides file name setting situations, for example, a situation where a data transfer destination or the like is set.

Second Embodiment

Next, description will be given of a mode as a second embodiment in which a character string extracted from a character string block is displayed in (entered to) a file name entry field, and separated words of the character string extracted from the character string block are displayed on a separated word list (choice list) in such a manner as to be individually recognizable to the user. Note that description will be omitted for contents common to the first embodiment such as the flow of the scan operation control in the MFP 110. In the following, a process of displaying character string blocks, which is the characteristic feature of this embodiment, will be mainly described.

The preview display unit 426 in this embodiment also has a function of displaying (entering) either a character string extracted from a selected character string block or one of separated words of the character string in a file name entry field, and displaying the rest on a separated word list (choice list) in such a manner that they are individually recognizable to the user. The preview display unit 426 also has a function of displaying the separated word list around the file name entry field. The preview display unit 426 can also display the separated word list near a character string corresponding to the separated word list and displayed in the file name entry field.

The preview display unit 426 also has a function of switching a character string displayed on the separated word list and a character string corresponding to the separated word list and displayed in the file name entry field with each other in response to a touch operation.

Figure 12:
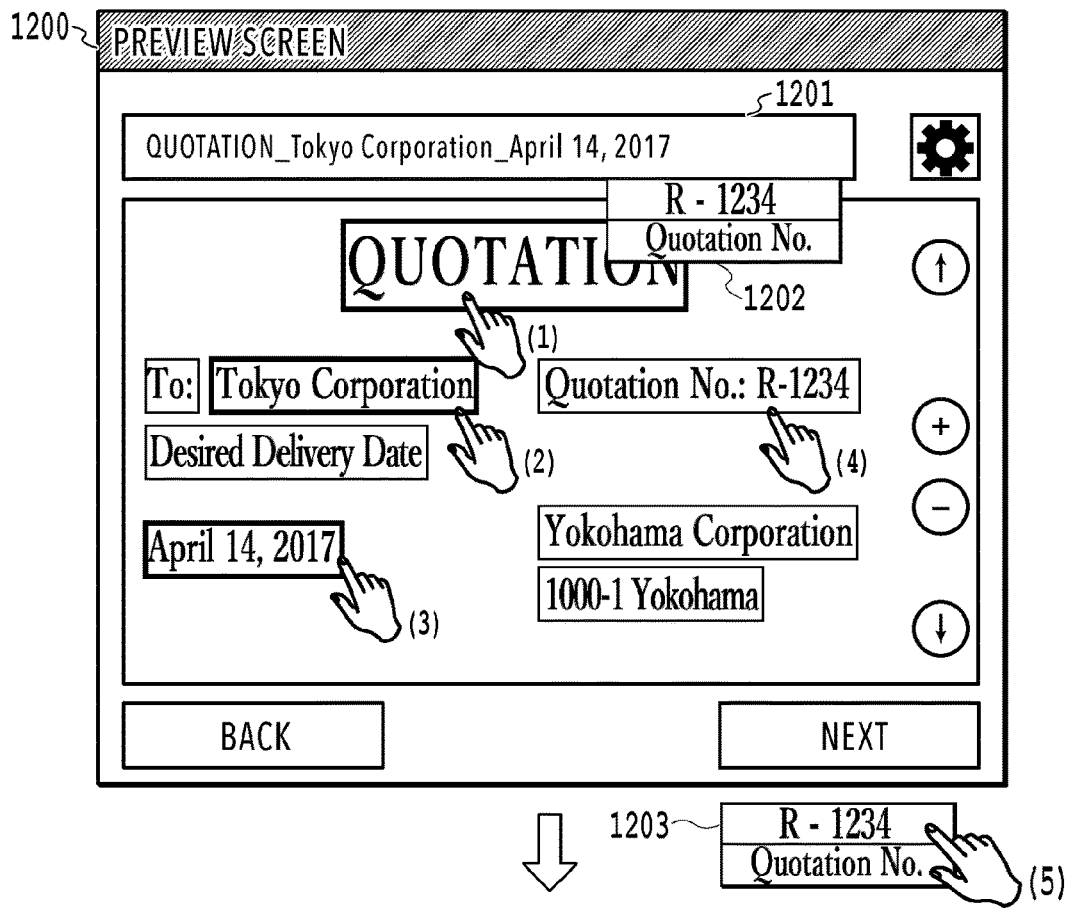
FIG. 12 is a diagram illustrating an example of a file name entry process according to a second embodiment.
Figure 12:
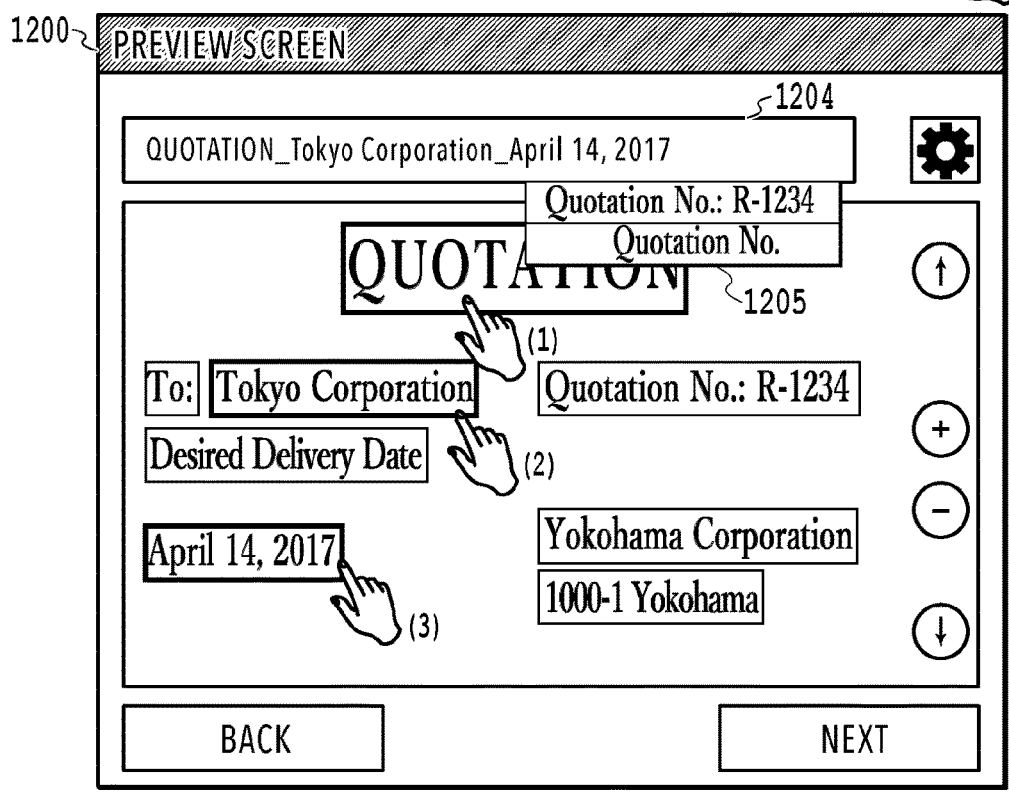

FIG. 12 is an explanatory diagram of a procedure to display and set one of separated words of a character string extracted from a character string block in the file name entry field. FIG. 12 illustrates a case where the character string block "Quotation No.: R-1234" is selected and "R-1234" on the separated word list is selected. Upon detection of a touch operation by the user on the character string block "Quotation No.: R-1234", an underscore, which is the predetermined delimiter, and "Quotation No.: R-1234" are displayed (entered) additionally at the end of the file name in a file name entry field 1201. Simultaneously, a separated word list 1202 is displayed adjacently to the bottom of the file name entry field 1201. On the separated word list 1202, a separated word button with "R-1234" is displayed in the first row and a separated word button with "Quotation No." is displayed in the second row.

Thereafter, upon detection a touch operation by the user on a separated word button 1203 with "R-1234" in the first row of the separated word list 1202, "Quotation No.: R-1234" in the file name entry field 1201 and "R-1234" on the separated word list are switched with each other. Consequently, in a file name entry field 1204, an underscore and "R-1234" are displayed additionally after "Apr. 14, 2017". "Quotation No.: R-1234" is displayed in the first row of a separated word list 1205.

The above is a flow for displaying a part of a character string in a selected character string block in the file name entry field.

Since the character string in the selected character string block is displayed in the file name entry field, a file name entry operation can be done with a single touch operation. This can enhance convenience for the user. Also, since the separated word list for the selected character string block is displayed around the file name entry field in such a manner as to be individually recognizable to the user, the user can easily select a separated word from the separated word list.

Since a separated word on the separated word list for the selected character string block and a character string displayed in the file name entry field are switched with each other in response to a touch operation, the user does not need to delete characters in the file name entry field. This can enhance convenience for the user.

Meanwhile, upon detection of a touch operation by the user on a character string block in a preview screen 1200, a separated word close to the coordinates at which the touch operation by the user has been detected can be the character string to be set in the file name entry field, as in the first embodiment.

Third Embodiment

Next, description will be given of a mode as a third embodiment in which a character string block and separated word blocks of the character string block are displayed in such a manner as to be individually recognizable to the user. Note that description will be omitted for contents common to the first embodiment such as the flow of the scan operation control in the MFP 110. In the following, a process of displaying character string blocks, which is the characteristic feature of this embodiment, will be mainly described.

In this embodiment, description will be given only of the difference from the first embodiment. Parts that are not particularly mentioned have the same configuration or involve the same procedure as the first embodiment.

The preview display unit 426 in this embodiment also has a function of displaying a character string block and separated word blocks obtained by separating the character string block in advance in such a manner that they are individually recognizable to the user.

Figure 13:
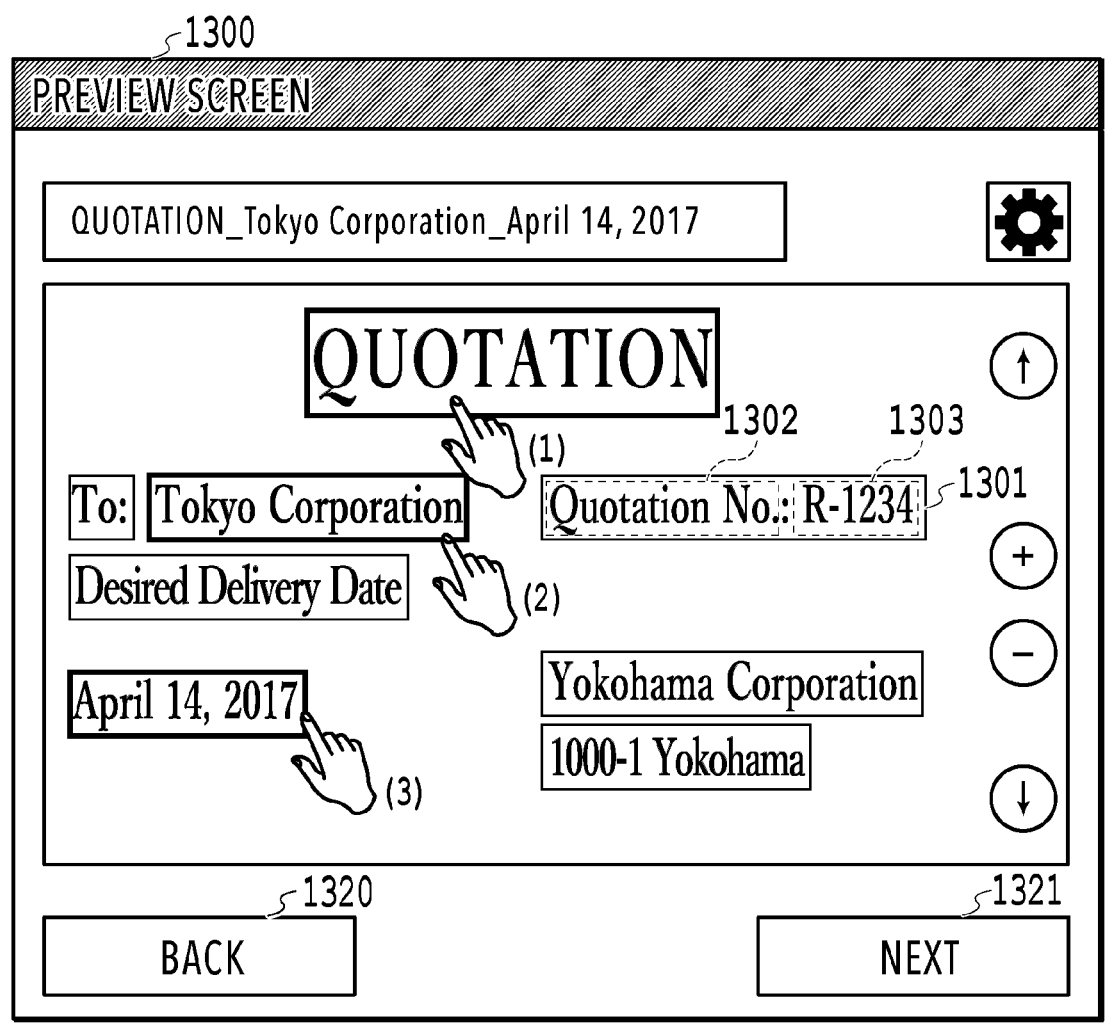
FIG. 13 is a diagram illustrating an example of a preview screen according to a third embodiment.

FIG. 13 is a diagram illustrating a state where a character string block and separated word blocks obtained by separating the character string block in advance are displayed on the preview screen. In this example, the character string blocks with "QUOTATION", "Tokyo Corporation", and "Apr. 14, 2017" are sequentially selected, so that a character string "QUOTATION_Tokyo Corporation_Apr. 14, 2017" is entered to the file name entry field. A character string block 1301 with "Quotation No.: R-1234" is displayed. Based on coordinate information of each word obtained by separating the character string extracted from the character string block 1301, separated word blocks 1302 and 1303 with "Quotation No." and "R-1234", respectively, are displayed on the character string block 1301 in such a manner as to be individually recognizable to the user.

Figure 14:
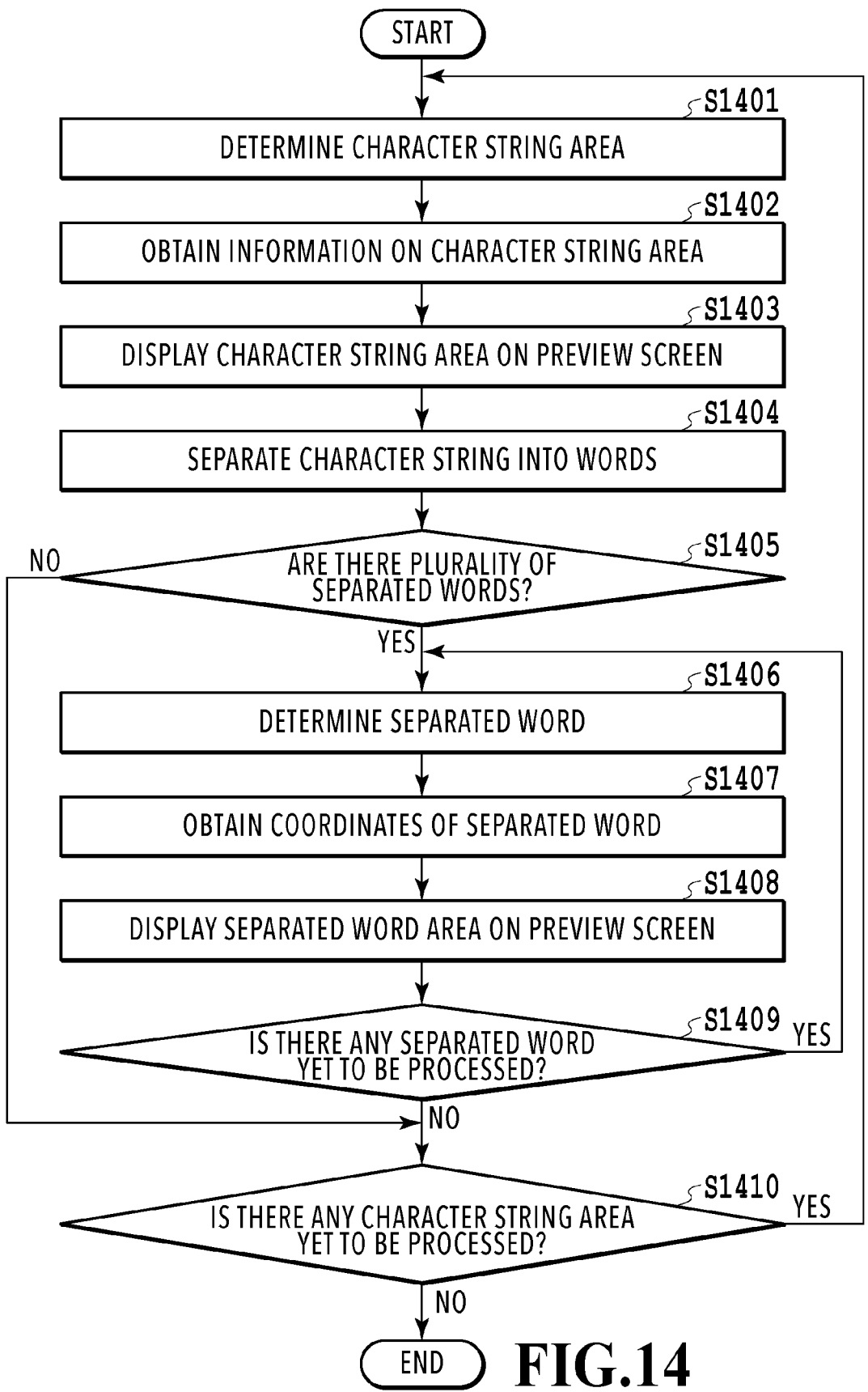
FIG. 14 is a flowchart illustrating details of a separated word block display process.

FIG. 14 is a flowchart illustrating a process of displaying a character string block and its separated word blocks by the preview display unit 426.

In S1401, the preview display unit 426 determines one character string block from among a plurality of character string blocks obtained by the image analysis unit 425.

In S1402, for the character string block determined in S1401, the preview display unit 426 obtains information on the character string block and the coordinates of the character string block identified by the image processing in S505 through the application transfer unit 424.

In 51403, the preview display unit 426 displays the character string block 1301 on a preview screen 1300.

The same processes as S1006 to S1009 are performed in S1404 to S1407, and detailed description thereof is omitted.

In S1408, the preview display unit 426 displays the separated word block 1302 or 1303 whose coordinates have been obtained in S1407 on the preview screen 1300.

In S1409, the preview display unit 426 determines whether there is any separated word yet to be processed. In a case where there is a separated word yet to be processed, the processing returns to S1406 and the processes of S1406 to S1409 will be performed. On the other hand, in a case where there is no separated word yet to be processed, the processing proceeds to S1410.

In S1410, the preview display unit 426 determines whether there is any character string block yet to be processed. In a case where there is a character string block yet to be processed, processing returns to S1401 and the processes of S1401 to S1410 will be performed. On the other hand, in a case where there is no character string block yet to be processed, the processing is terminated.

Figure 15:
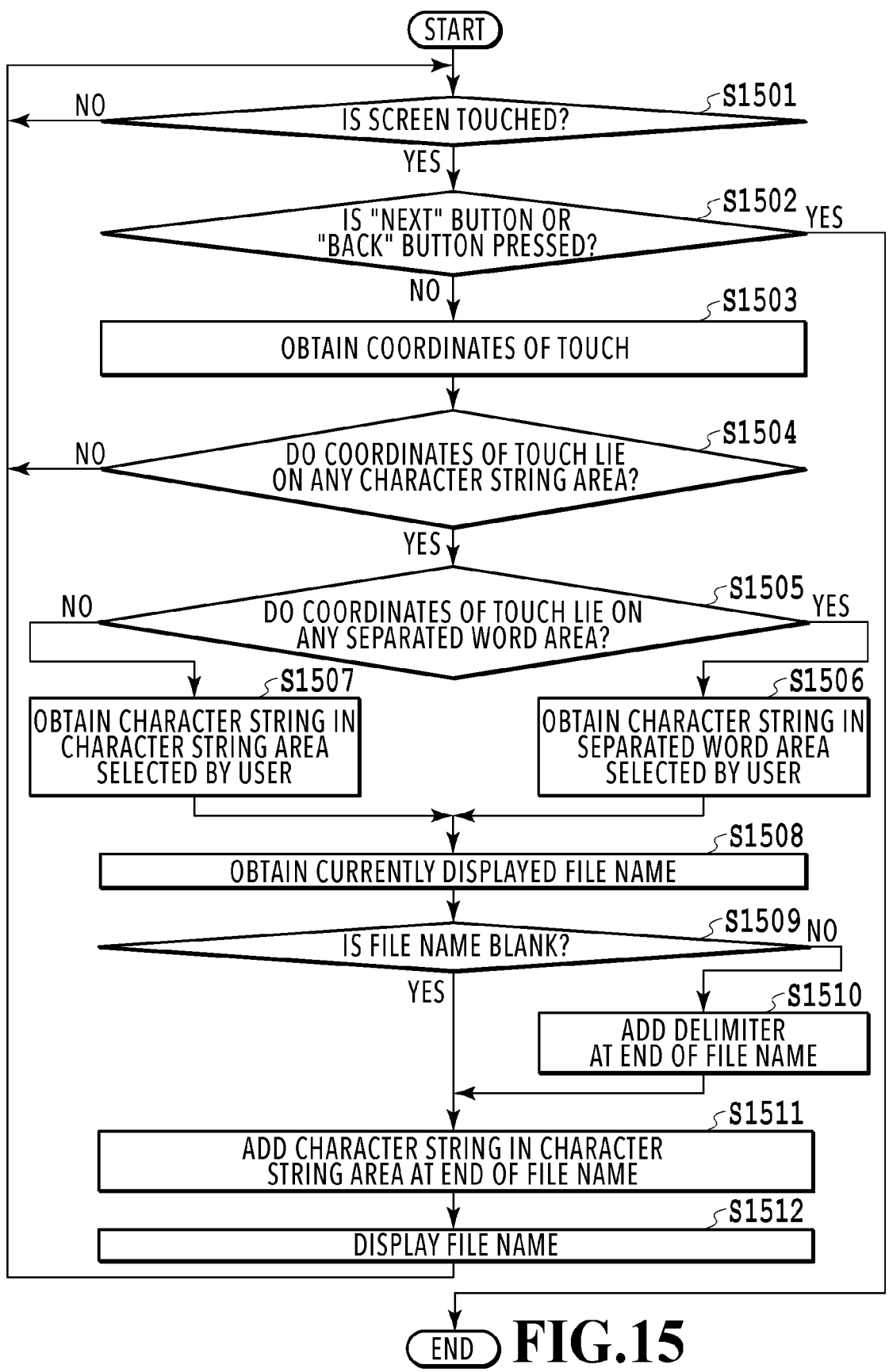
FIG. 15 is a flowchart illustrating details of a file name generation process.

FIG. 15 is a flowchart illustrating the file name generation process by the preview display unit 426 according to this embodiment.

The same processes as S1001 to S1004 are performed in S1501 to S1504, and detailed description thereof is omitted.

In S1505, the preview display unit 426 determines whether the positional coordinates of the touch operation lie on one of the separated word blocks 1302 and 1303. Whether the positional coordinates of the touch operation lie on one of the separated word blocks 1302 and 1303 is determined based on whether the coordinates of the touch are within the coordinate area of one of the separated word blocks 1302 and 1303 displayed in a preview display area 810 (within one of the rectangles identified by the positional coordinates indicating the four corners of rectangles). In a case where the positional coordinates of the touch operation lie on one of the separated word blocks, the processing proceeds to S1506, in which the character string in the separated word block is obtained. On the other hand, in a case where the positional coordinates of the touch operation do not lie on either of the separated word blocks, the processing proceeds to S1507, in which the character string in the character string block is obtained.

The same processes as S1017 to S1021 are performed in S1508 to S1512, so that the separated word obtained in S1506 or the character string in the character string block obtained in S1507 is displayed additionally in the file name entry field.

Since a character string in a character string block and separated words of the character string are displayed on the preview screen in such a manner as to be individually recognizable to the user before the user performs a touch operation, the character string or one of the separated words can be set as a part of the file name with a single touch operation. In this way, convenience for the user can be enhanced as compared to a case where the character string or one of the separated words is set as a part of the file name with two or more touch operations.

[Modification]

A modification of this embodiment will be described below.

It is also possible to generate a file name by adding a delimiter and a character string selected by a touch operation at the head of a file name displayed in the file name entry field in the order mentioned from the file name side.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to enhance convenience for a user in a situation where the user sets the file name or the like of a scan image by using character strings obtained by performing an OCR process on the scan image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-193616, filed Oct. 3, 2017, which is hereby incorporated by reference wherein in its entirety.

What is claimed is:

1. An apparatus for performing a predetermined process on a scan image obtained by scanning a document, comprising:
a memory that stores a program; and
a processor that executes the program to perform:
analyzing the scan image to identify a plurality of character string blocks each assumed as a single continuous character string in the scan image;
controlling a display to display the scan image on a UI screen, wherein a user designates a position on the displayed scan image to select one of the identified character string blocks;
obtaining a character string corresponding to the selected one of the character string blocks, wherein the obtained character string is a character string recognized by performing an OCR process on the selected one of the character string blocks;
automatically extracting a plurality of separated words from the obtained character string in a case where the obtained character string corresponding to the selected one of the character string blocks satisfies a predetermined condition;
controlling the display to display, on the UI screen, a list that includes, as candidates, all of the extracted plurality of separated words and the obtained character string corresponding to the selected one of the character string blocks, wherein a displayed order of the extracted plurality of separated words displayed in the list is determined based on the position designated on the displayed scan image by the user, and wherein the processor further causes the user to select one candidate from the candidates included in the displayed list; and
setting the selected one candidate as information for the predetermined process.

2. The apparatus according to claim 1, wherein the list is displayed adjacently to the selected one of the character string blocks.

3. The apparatus according to claim 1, wherein the extracted plurality of separated words on the list are displayed in ascending order of distance between each of the extracted plurality of separated words and the position designated on the displayed scan image by the user for selecting the selected one of the character string blocks.

4. The apparatus according to claim 1, wherein the list is displayed adjacently to an entry field where the information for the predetermined process is to be input.

5. The apparatus according to claim 1, wherein, if the obtained character string corresponding to the selected one of the character string blocks does not satisfy the predetermined condition, the information for the predetermined process is set by using the obtained character string corresponding to the selected one of the character string blocks.

6. The apparatus according to claim 1, wherein boxes enclosing the plurality of character string blocks identified by analyzing the scan image are displayed on the UI screen along with the scan image so that the user can recognize the identified plurality of character string blocks.

7. The apparatus according to claim 1, wherein
the predetermined process is a process of storing the scan image, and
the set information is a file name with which to store the scan image.

8. The apparatus according to claim 1, wherein
the predetermined process is a process of storing the scan image, and
the set information is a name of a folder in which to store the scan image.

9. The apparatus according to claim 1, wherein
the predetermined process is a process of uploading the scan image to a predetermined location, and
the set information is a path name indicating an upload destination.

10. The apparatus according to claim 1, wherein
the predetermined process is a process of faxing the scan image, and
the set information is a fax number.

11. The apparatus according to claim 1, wherein
the predetermined process is a process of emailing the scan image, and
the set information is an email address.

12. A method of controlling an apparatus for performing a predetermined process on a scan image obtained by scanning a document, comprising:
analyzing the scan image to identify a plurality of character string blocks each assumed as a single continuous character string in the scan image;
displaying the scan image on a UI screen of a display, wherein a user designates a position on the displayed scan image to select one of the identified character string blocks;
obtaining a character string corresponding to the selected one of the character string blocks, wherein the obtained character string is a character string recognized by performing an OCR process on the selected one of the character string blocks;
automatically extracting a plurality of separated words from the obtained character string in a case where the obtained character string corresponding to the selected one of the character string blocks satisfies a predetermined condition;
controlling the display to display, on the UI screen, a list that includes, as candidates, all of the extracted plurality of separated words and the obtained character string corresponding to the selected one of the character string blocks, wherein a displayed order of the extracted plurality of separated words displayed in the list is determined based on the position designated on the displayed scan image by the user, and wherein the user is caused to select one candidate from the candidates included in the displayed list; and
setting the selected one candidate as information for the predetermined process.

13. A non-transitory computer readable storage medium storing a program for causing a computer to perform:
analyzing a scan image to identify a plurality of character string blocks each assumed as a single continuous character string in the scan image, wherein the scan image is obtained by scanning a document;
controlling a display to display the scan image on a UI screen, wherein a user designates a position on the displayed scan image to select one of the identified character string blocks;
obtaining a character string corresponding to the selected one of the character string blocks, wherein the obtained character string is a character string recognized by performing an OCR process on the selected one of the character string blocks;
automatically extracting a plurality of separated words from the obtained character string in a case where the obtained character string corresponding to the selected one of the character string blocks satisfies a predetermined condition;
controlling the display to display, on the UI screen, a list that includes, as candidates, all of the extracted plurality of separated words and the obtained character string corresponding to the selected one of the character string blocks, wherein a displayed order of the extracted plurality of separated words displayed in the list is determined based on the position designated on the displayed scan image by the user, and wherein the user is caused to select one candidate from the candidates included in the displayed list; and
setting the selected one candidate as information for the predetermined process.

* * * * *